United States Patent [19]

Sheu

[11] Patent Number: 5,038,932

[45] Date of Patent: Aug. 13, 1991

[54] CASSETTE AND VIDEO TAPE HOLDER

[76] Inventor: Shwan Sheu, No. 14, buu wei Road. ho feng Village, pi tour Country, Chunghua, Taiwan

[21] Appl. No.: 616,148

[22] Filed: Nov. 20, 1990

Related U.S. Application Data

[63] Continuation-in-part of Ser. No. 472,500, Jan. 30, 1990, abandoned.

[51] Int. Cl.⁵ .......................................... B65D 85/672
[52] U.S. Cl. .................................... 206/387; 220/346; 312/12
[58] Field of Search ................ 206/387, 309; 220/345, 220/346, 350, 347, 351; 312/9, 10, 12, 14, 15

[56] References Cited

U.S. PATENT DOCUMENTS

| | | | |
|---|---|---|---|
| 2,975,889 | 3/1961 | Brown | 220/345 X |
| 3,897,885 | 8/1975 | Joyce | 220/345 |
| 3,942,630 | 3/1976 | Phillips | 220/346 X |
| 4,485,988 | 12/1984 | Kikuya et al. | 206/387 X |
| 4,664,261 | 5/1987 | Frodelius | 206/387 |
| 4,738,361 | 4/1988 | Ackeret | 206/387 X |
| 4,875,578 | 10/1989 | Nehl | 206/387 X |
| 4,875,584 | 10/1989 | Ackeret | 206/387 |

Primary Examiner—Paul T. Sewell
Assistant Examiner—Jacob K. Ackun, Jr.
Attorney, Agent, or Firm—Varndell Legal Group

[57] ABSTRACT

A cassette and video tape holder comprising an upper case body and a lower case body assembled together. The upper case body can be pulled to slide in relation to the lower case body and a pivotally movable lid is connected to the upper case body which is automatically opened by the sliding of the upper case body so that a tape contained within the holder can be removed.

1 Claim, 4 Drawing Sheets

CASSETTE AND VIDEO TAPE HOLDER

CROSS-REFERENCE TO RELATED APPLICATIONS

This application is a continuation-in-part of U.S. Ser. No. 07/472,500, filed Jan. 30, 1990, now abandoned.

BACKGROUND OF THE INVENTION

The common cassette tapes cases, as shown in FIG. 1, have many disadvantages. In order to insert the cassette tape in a tape case or holder, the cassette tape has to be placed in the upper case body with the tape opening side facing toward the lower side of the upper case body. Thereafter, the upper case body with the cassette tape contained therein is rotated downward to cover on the lower case body. Otherwise, the holes B in the cassette tape will not fit over the projections A in the lower case body, thereby inhibiting the upper case body from completely closing on the lower case body. In order to remove the tape from the case, the case generally has to be held in both hands, and the upper case body is rotated relative to the lower case body, so that the cassette tape can be grasped. However, the tape can easily fall out of the case when the upper case body is rotated to open the case, if it is done carelessly. This can result in the tape being damaged if, for example, it hits the ground.

SUMMARY OF THE INVENTION

This invention comprises a cassette tape holder having an upper case body and a lower case body assembled together, so that the upper case body can be pulled to slide horizontally in relation to the lower body.

The upper case body has a pivotally rotatable lid at its front end, a lengthwise slot on its inner wall which receives a straight narrow rail on the inner side wall of the lower case body, which arrangement permits the lower case body to slide within the upper case body so that it can be pulled to slide straight in relation to the lower case without separating therefrom.

The movable lid has a connecting flange with its inner end pivotally fixed to the side wall of the upper case body by a pin, so that the lid can be opened in a rotating manner when the upper case body is pulled rearward relative to the lower case body, the rotating movement of the lid is guided by a vertical narrow opening provided in the side wall of the lid and a tenon provided at the front end of the lower case body.

The upper case body has a mortise at the rear end of its side walls and the lower case body has a matching tenon at the rear end of its side walls, and the mortise and the tenon interlock with each other with sufficient force, so as to prevent either of the case bodies from moving relative to each other if, for example, the cassette holder is inclined.

DETAILED DESCRIPTION OF THE INVENTION

Figure 1:
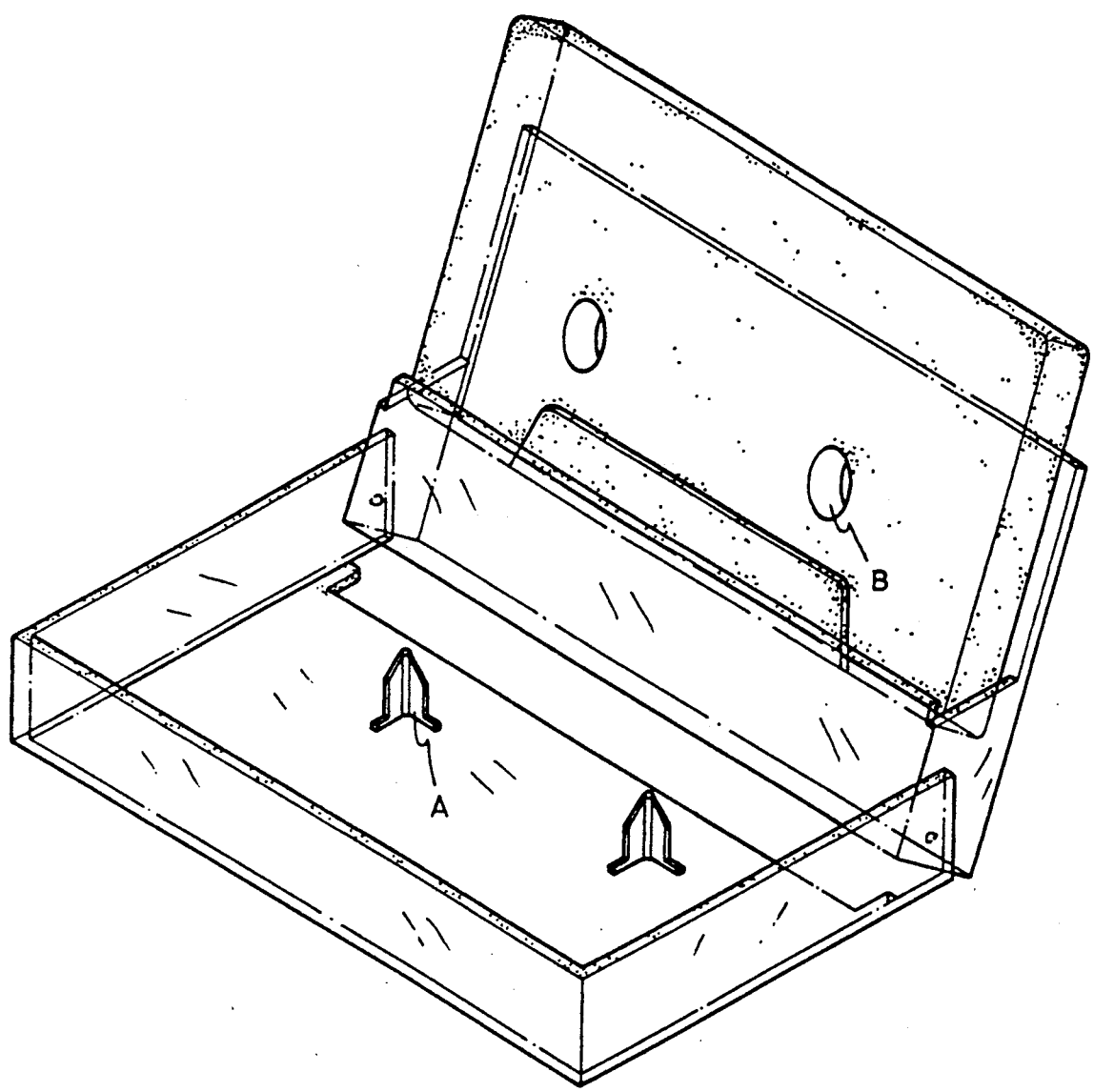
FIG. 1 is a perspective view of a conventional cassette tape case.
Figure 2:
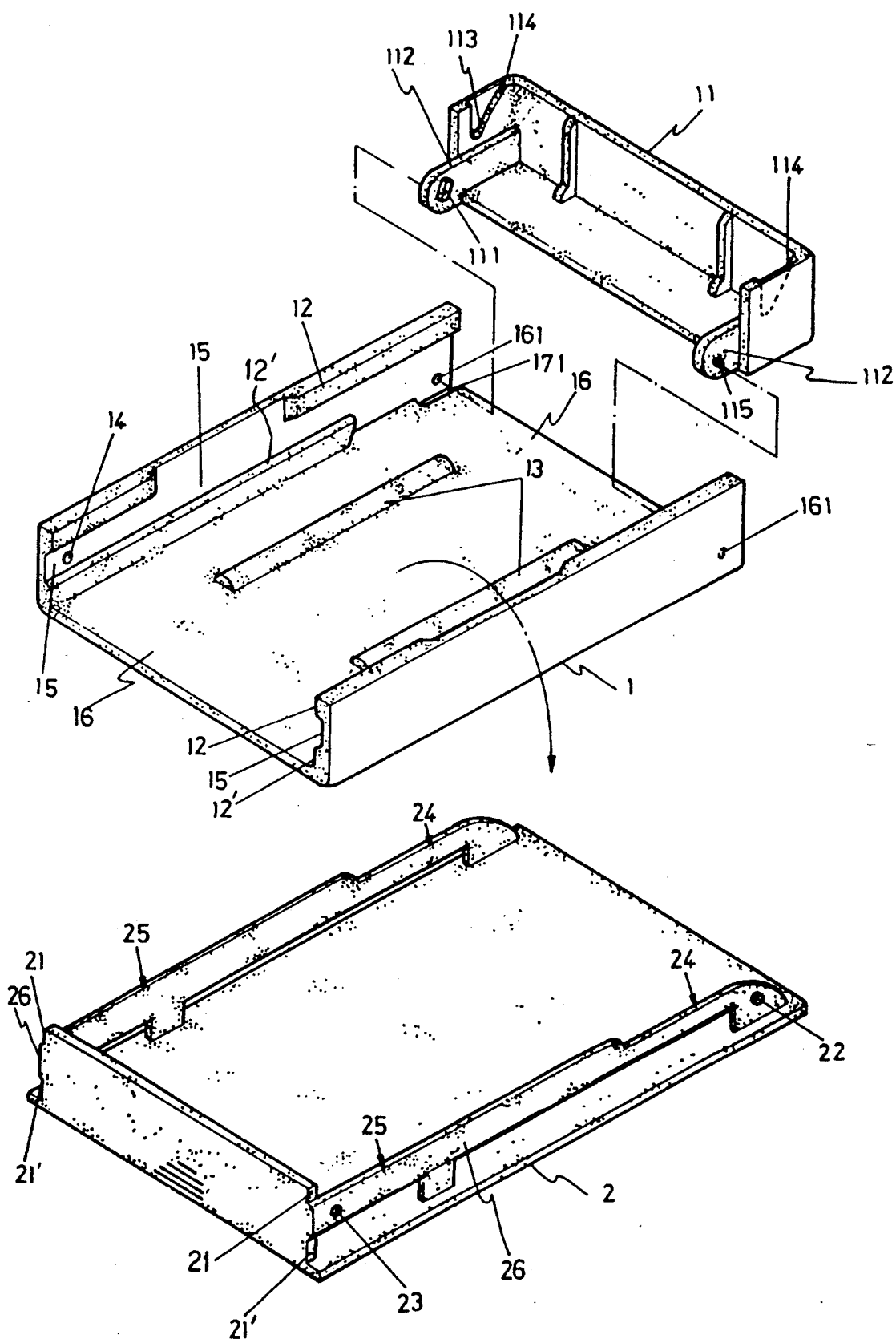
FIG. 2 is an exploded perspective view of the cassette and video tape holder of the present invention.

The cassette and video tape holder of the present invention, as shown in FIG. 2, comprises an upper case body 1 (shown upside down) and a lower case body 2 movably assembled with each other. The upper case body 1 has two lengthwise side walls each with a pivot hole 161 symmetrically arranged at their front ends. The upper case body includes a movable lid 11 pivotally connected with the front end of the upper case body 1. The movable lid 11 has two connection flanges 112 extending out from its opposite side walls into the upper case body and each flange 112 has a pivot 115 which can be inserted into a respective pivot hole 161 of the side walls of the upper case body 1, in a manner such that the movable lid 11 is pivotally assembled with the upper case body 1 and can be rotated about pivot 115.

The inner face of the end of each connecting flange 112 includes a stopping projection 111 which includes a flat inclined surface relative to the longitudinal direction of the upper case body. The movable lid 11 also has a vertical recess 113 in one or both of the opposite side walls, and the recess 113 has a tapered edge 114.

The upper case body 11 is also provided with an upper rail 12 and a lower rail 12' which are arranged lengthwisely along the inner side walls of the upper case body 11 and protrude inward. The rails 12 and 12' provide a long recess 15 therebetween. A mortise 14 is provided at the inner surface near the rear end of the side walls, and a plurality of lengthwise protruding ridges 13 are provided on the bottom surface of the upper plate 16 of the upper case body 1. A notch 171 is cut at both side ends of the front of the upper plate 16 of the upper body 1 just below the pivot holes 161 for receiving the ends of the flanges 112, which extend into notches 171 when the movable lid 11 is rotated upward.

The lower case body 2 is provided with an upper opening or notch 21 and a lower opening or notch 21' on its rear wall forming a projection therebetween. The lower case body has opposite side walls 26 extending from the projection formed between openings 21 and 21' to near the front the lower case body 2. Projections 22 are provided at the front ends of the side walls 26 which are received in the recess 113 of the movable lid 11. Tenons 23 are provided at the rear ends of the side walls 26 for engaging with the mortises 14 in the upper body 1. The height of the front half section 24 of the side walls 26 is lower than that of the rear half section 25 of the walls 26.

Figure 3A:
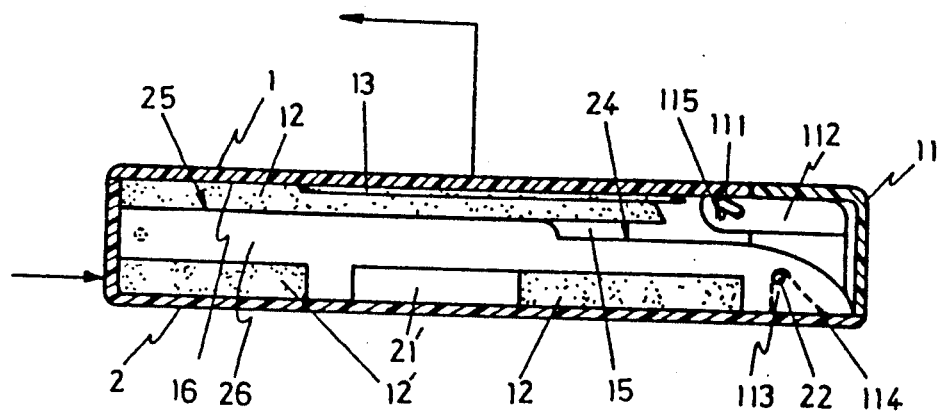
FIG. 3A is a cross-sectional view of the cassette and video tape holder of the present invention in a closed position.
Figure 3B:
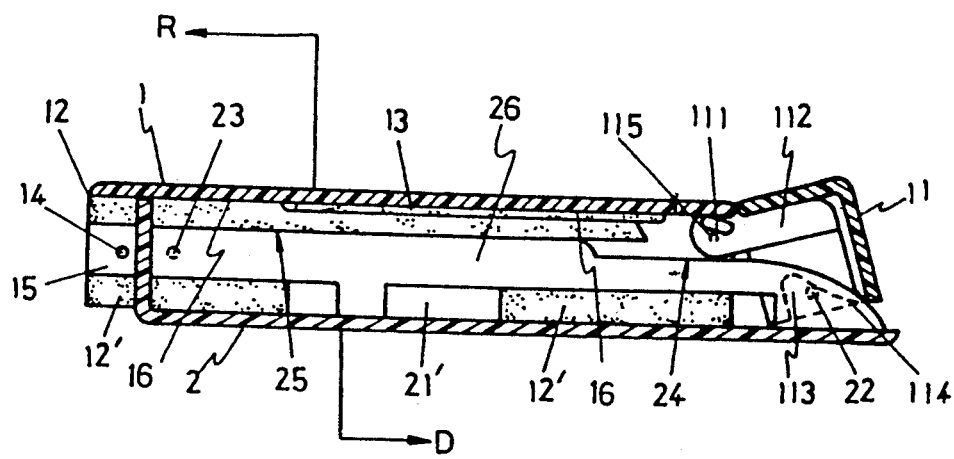
FIG. 3B is another cross-sectional view of the cassette and video tape holder of the present invention in a beginning opening position.
Figure 4:
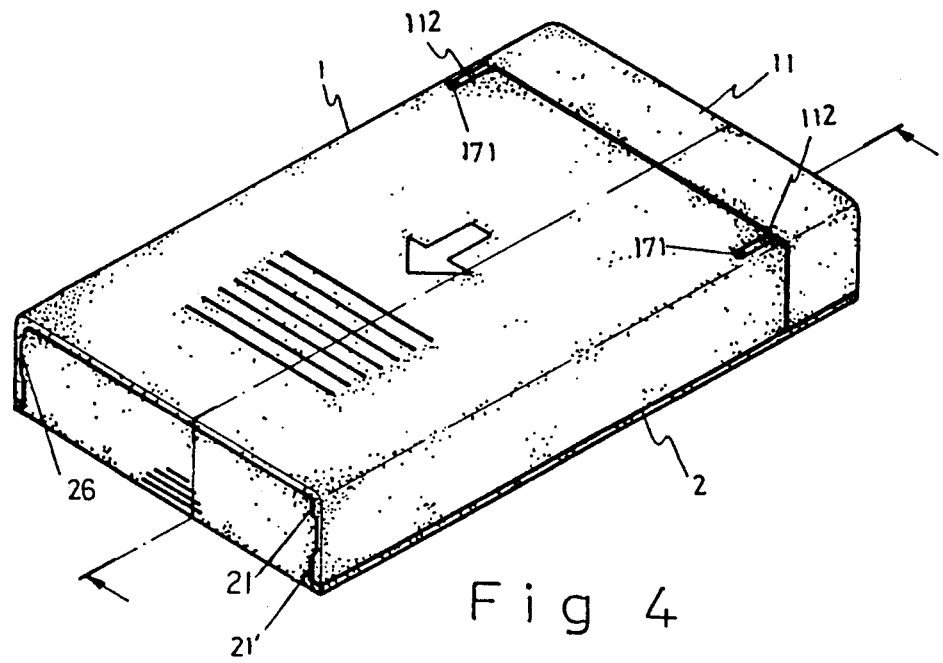
FIG. 4 is a perspective view of the cassette and video tape holder of the present invention in a closed position.
Figure 5:
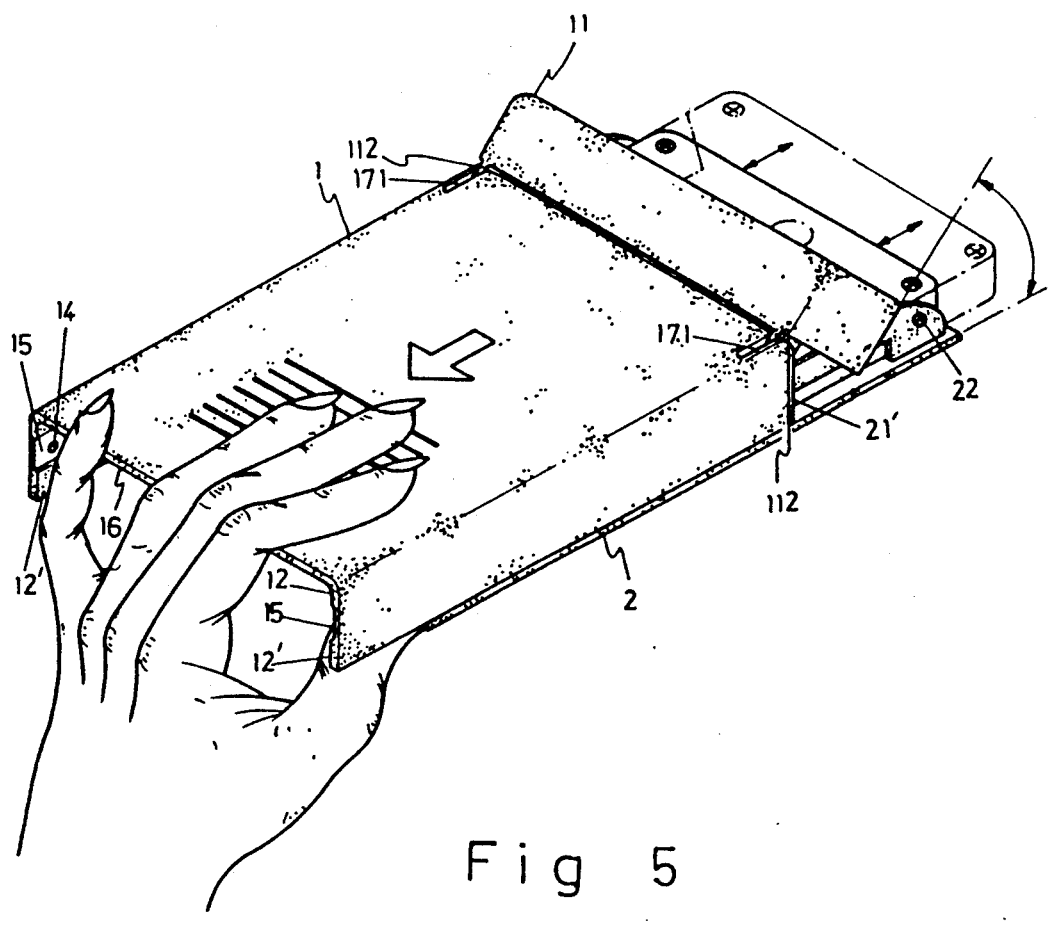
FIG. 5 is a view of the cassette and video tape holder of the present invention in an opening position.

As shown in FIGS. 4 and 5, when the upper body 1 with the movable lid 11 is closed on the lower body 2, the rails 12, 12' of the upper body 1 are arranged within the openings 21, 21' of the lower body 2, and the side walls 26 of the lower body 2 are located in the long recesses 15 of the upper body 1. By this arranged the upper body 1 can move right and left along on the lower body 2. In addition, as shown in FIGS. 3A and 3B, when the cassette holder of the present invention is closed, the tenons 23 of the lower body 2 engage in the mortises 14 and the projections 22 of the lower body 2 are inserted in the vertical openings 113 of the movable lid 11, so that the upper and the lower body 1, 2 can be closed together in an interlocking arrangement without any possibility of separation, unless a sufficient and appropriate exterior force is used to pull them apart by removing tenons 23 from mortises 14.

Figure 3C:
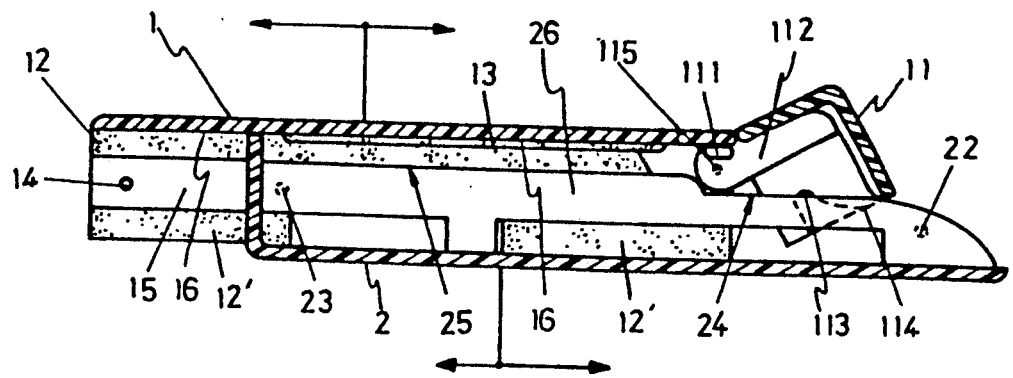
FIG. 3C is a further cross-sectional view of the cassette and video tape holder of the present invention in a further opening position.

FIGS. 3A to 3C show the relative movement of the upper and lower case bodies 1, 2. When opening the holder, the movable lid 11 is pivoted or rotated upward by, for example, holding the top and the bottom of the closed upper and lower case body with one hand and moving either the upper body 1 in the direction marked by the arrowhead in FIGS. 4 and 5 (the R direction shown in FIG. 3B) or the lower body in the direction marked D in FIG. 3B. This action forces the upper body 1 to move backward relative to the lower body 2, by means of the rails 12, 12' and the long recesses 15 of the upper case body respectively moving along the openings 21, 21' and the side walls 26 of the lower case body 2. At the same time, the recess 113 moves along the projections 22 and the pivot 115 provides the pivoting movement for rotating movable lid 11 upward. The opening movement of the movable lid 11 can be stopped and kept at a widest limited angle when the stopping projection 111 is pivoted so as to become parallel to and immovably abut the bottom surface of the upper plate 16 of the upper body 1. For example, the stopping projection 111 is constructed to have a flat surface arranged at an inclined angle relative to the upper plate 16 of the upper case body 1 when the holder of the present invention is in a closed position as shown in FIG. 3A. As the movable lid 11 is rotated upward, an edge of projection 111 is forced to slide along and beyond the lower surface of the upper plate 16, as shown in FIG. 3B. Continued rotation of the movable lid 11 upward results in the flat surface of projection 111 abutting the lower surface of upper plate 16 for holding the movable lid 11 in a fixed relationship relative to the upper case body as shown in FIG. 3C. Unlocking or disengaging the movable lid 11 from the upper plate 16 is achieved by rotating it downward and reversing the relative movements of the projection 111 and lower surface of upper plate 16 of the upper case body 1 for opening of the movable lid 11. The degree or opening angle of the movable lid 11 can be limited by projection 111 which is arranged so that a tape contained in the holder can easily be taken out.

In order to enhance the opening and closing processes of the movable lid 11, sufficient flange space should be provided above the front half sections 24. Accordingly, the front half sections 24 of the side walls 26 are made to have a lower height than the rear half sections 25. For closing the movable lid 11, the reverse order of the steps mentioned above can be used.

It is possible that the upper body 1 is under the lower body 2 during the closing or opening process of the movable lid, and the opening angle of the movable lid 11 can become so large that the openings or recess 113 cannot be inserted into the projections 22. This makes is impossible to slide the projections 22 along the tapered edge 114 so that they move into the recesses 113. In other words, the projections 22 can pass beyond opening or recess 113, inhibiting the closing of the movable lid 11. To prevent this situation, the stopping projections 111 set on the connecting flanges 112 are shaped so that the stopping projections 111 will be stopped by the bottom surface of the upper plate 16 of the upper case body 1 and, thus, the opening angle for the movable lid 11 will be limited, enabling the openings or recess 113 to be received the projections 22 so that the lid 11 can be closed.

The upper and the lower case body 1 and 2 are in sliding relationship when they are closed together. In order to prevent the weight of a tape contained in the hold from forcing the upper body 1 to slide on the lower body 2 when the holder is inclined, the mortises 14 are provided in the upper body 1 and the tenons 23 provided in the lower body 2 and arranged so that they will engage with each other when the bodies 1, 2 are closed together. This arrangement can prevent the lid 11 from opening even if the holder is held at an inclined position. On the other hand, this arrangement enables the tenons 23 to disengage from the mortise 14 with a small amount of force for removal of the tape.

When the holder of the present invention is use with a cassette tape, more than one lengthwise projecting ridge 13 can be provided on the bottom surface of the upper plate 16 of the upper body 1 or on the upper surface of the bottom plate of the lower body 2, so as to prevent a tape put therein from moving around and producing noises. In additional, the outer surfaces of both case bodies 1 and 2 can be roughened, so as to prevent fingers from sliding off during handling.

In practice, the side walls 26 of the lower body 2 can be made to incline slightly inward, so that the rails 12, 12' in the upper body 2 can be inserted easily into the narrow openings 21, 21' in the lower body 2 and the side walls 26 can easily be inserted into the long recesses 15 when assembling the upper and the lower body 1 and 2 together.

This structure of cassette tape holder of the present invention can also be applied to a video tape or CD tape.

I claim:

1. An audio and video cassette tape holder comprising;
    an upper case body having an upper plate and two parallel side walls, said side walls each having a pivot holes at a front section thereof, a mortise at a rear section thereof, an upper rail and a lower rail projecting inward forming a long recess therebetween, said upper plate having a notch at both its side ends at its front below said pivot holes and at least one lengthwise projecting ridge on its bottom surface;
    a movable lid having two parallel short sides each having a vertical recess with a tapered edge and a connecting flange, said flanges each having a pivot at its end received in said pivot holes of said upper case body so that the movable lid can rotate about said pivots with said flanges received in said notches of said upper case body;
    a lower case body having two lengthwise side walls each having a straight and narrow lengthwise opening at its top and bottom, said side walls also each having an outward tenon at its rear end and a height at its front half section lower than that at its rear half section; and
    said upper case assembled within said lower case body with said long recesses in said upper body receiving said side walls of said lower case body and said upper and lower rails of said upper body received in said openings of said lower case body, so that said upper body is slidable relative to said lower body and said tenons of said lower body can engage with said mortises of said upper one body for holding said upper and lower case bodies in place relative to each other, said movable lid can rotate upward with said tapered edge of said vertical openings sliding along said projections of said lower case body when said upper case body is slid backward relative to said case lower, said movable lid rotating to a limited widest angle and then being held in place by action of said stopping projections of said connecting flanges abutting a bottom surface of said upper plate of said upper case body when said tape holder is opened from a closed position by relative movement of said upper case body.

* * * * *